United States Patent [19]
Charkey et al.

[11] 3,898,103
[45] Aug. 5, 1975

[54] SEMI-CONDUCTOR ELECTRODE DEPOLARIZER

[75] Inventors: Allen Charkey, Flushing; Frederick P. Kober, Bayside, both of N.Y.

[73] Assignee: Electrochem, Inc., New York, N.Y.

[22] Filed: May 13, 1971

[21] Appl. No.: 143,244

[52] U.S. Cl. .......................................... 136/120 FC
[51] Int. Cl.² .......................................... H01M 13/04
[58] Field of Search .............................. 136/120 FC

[56] References Cited
UNITED STATES PATENTS

| | | | |
|---|---|---|---|
| 3,305,403 | 2/1967 | Corso, Jr. et al. | 136/120 FC |
| 3,432,355 | 3/1969 | Niedrach et al. | 136/120 FC X |
| 3,457,113 | 7/1969 | Deibert | 136/121 |
| 3,607,433 | 9/1971 | Isenburg, II et al. | 136/120 FC |

FOREIGN PATENTS OR APPLICATIONS

| | | | |
|---|---|---|---|
| 1,010,115 | 11/1965 | United Kingdom | 136/120 FC |
| 1,502,001 | 10/1967 | France | 136/120 FC |

*Primary Examiner*—L. Dewayne Rutledge
*Assistant Examiner*—M. J. Andrews
*Attorney, Agent, or Firm*—Donald E. Nist

[57] ABSTRACT

An oxygen electrode is based on silver and a chemisorbing semi-conducting oxide. The chemisorbing lattice-defect oxide/silver catalyst mixture, particularly with defect copper oxide permits performance rates in air-depolarized cells that are equivalent to those previously achieved only with platinum catalyst electrodes but at considerably lower cost. Performance characteristics of silver/mercury fuel-cell electrodes when used with air are surpassed.

1 Claim, No Drawings

SEMI-CONDUCTOR ELECTRODE DEPOLARIZER

This application is a continuation of Ser. No. 809,405 filed Mar. 21, 1969, now abandoned.

BACKGROUND

This invention relates to gaseous cells and more particularly, to oxygen or air electrodes for use in introducing oxygen from an external source, preferably the atmosphere, into such cells.

The air-derived oxygen in the air-depolarized alkaline-electrolyte cell serves two purposes. First, it is adsorbed on the electrode surface at which it is introduced in elemental form and is reduced to hydroxyl ion ($OH^-$) in one EMF couple. The hydroxyl ions migrate through the electrolyte to the opposite electrode where they react with the positively-charged material in a second EMF couple and release an electron to the conductor. Second, the oxygen acts as a deplorizing material to prevent blocking or polarization of the other electrode by the evolution of hydrogen. Hydrogen gas is released at the electrode from the hydrogen ions during the reduction reactions. The gaseous hydrogen, in sufficient quantity, may block access of the electrolyte to the electrode and will, if not eliminated, completely stop the action of the cell. During low discharge rates, there is sufficient diffusion and dissolution within the cell, so that the hydrogen does not accumulate and the cell voltage is maintained. However at high discharge rates, the electrode is quickly blocked by the hydrogen and as a result the cell voltage declines rapidly. In a properly depolarized electrode the oxygen, acting as a depolarizer, combines with the hydrogen to form water and therefore the action of the cell continues.

The depolarization reaction does not take place efficiently when it is catalyzed. In the past it has been proposed to use various oxide mixtures where the body of the air electrode has been carbon. Such mixtures have been applied or formed at the surface or within the body of the carbon electrode. These mixtures have been satisfactory at the low discharge rates practices for carbon electrode dry cells. With the advent of the new high-rate air cells, however, such electrodes have not been able to depolarize the large amounts of hydrogen released at the specified high rates. Until now the only satisfactory catalytic depolarizers for such cells have been the precious metal hydrogen absorbers such as platinum, rhodium and the related active hydrogen catalysts. More recently, mercury and highly amalgamated silver catalysts have been proposed as oxygen electrodes for fuel cells, as disclosed in U.S. Pat. No. 3,318,736. This latter is of course a variation on the porous amalgamated silver electrode used in the high-drain silver-oxide/Zn cells of Andre. For optimum results at high current density discharge rates such catalyst-depolarized electrodes require large catalyst loadings per square foot of electrode surface area. For platinum, the optimum value is between 6 to 10 grams of precious metal per square foot and for silver-mercury, the optimum value is between 35 to 40 grams of mixture per square foot. The high cost of platinum, silver and mercury combined with the high loadings of these materials required for satisfactory performance result in objectionably expensive batteries when platinum or silver-mercury are used as the catalyst in an oxygen electrode.

OBJECTS

It is accordingly a principal object of the present invention to produce an improved oxygen electrode.

It is a further object to produce an oxygen electrode incorporating inexpensive catalysts that will produce cell performances to levels comparable to those obtained with oxygen electrodes employing the more expensive noble catalysts presently in use.

It is a still further object to provide an oxygen electrode which gives performance characteristics similar to platinum and silver-mercury at reduced cost.

THE INVENTION

This invention is based on our discovery that certain chemisorbing semiconductor oxides, when mixed with silver powder and fabricated into air-electrodes have excellent depolarizing capabilities. The effective oxides are those that are insoluble in the electrolytes and have either an inherent or doped lattice defect structure and impart good chemisorption properties to the semiconductor oxide. The semi-conductor oxides suitable for admixture with silver for the oxygen electrodes are (a) the intrinsic semi-conducting oxides including copper (II) oxide and cadmium oxide, and (b) the extrinsic semi-conducting oxided product by the addition of dopants, particularly in lithium-doped nickel oxide and in titanium-doped iron oxide, respectively. By intrinsic semi-conductors we refer generally to those materials where the band gap at operating temperature is such that the ambient thermal energy is sufficient to transfer electrons from the valence band to the conduction band. By extrinsic semi-conductors we refer specifically to those where selected impurity levels are introduced into the crystal to change, and preferably to narrow, the gap between the valence band and the conduction band. Copper and cadmium lattice-defect oxides are functioning examples of semiconductor oxides that we have found will operate, with black defect copper (II) oxide as the preferred material because it is cheaper, and provides depolarizing capabilities approaching those of platinum.

Copper (II) oxide, namely the semi-conducting black, lattice-defect, oxide having a lattice-type defect at the oxygen layer, when mixed with silver powder and supported in the usual manner will, at half the loading of the Ag/Hg electrode exceed such an electrode in depolarizing performance at high discharge rates. It will, in fact, substantially duplicate and exceed the performance characteristics of platinum electrodes costing 50 times as much. This invention improves the economics of air batteries to the point where they are feasible for transportation and propulsion systems as well as for communication operations. In addition, according to another aspect of our invention, these electrodes provide simple inexpensive oxygen-electrodes for fuel cells where pure oxygen sources are the active cathode materials.

In the preferred practice of this invention the silver-black defect copper oxide mixture, in powder form, is blended with a polymer emulsion containing a hydrophobic polymer that will be stable in the alkaline electrolyte to form a paste. The paste is then formed into thin foils which are dried to cure and set the polymer. The cured polymer-metal foil is then bonded to a supporting screen to maintain the desired electrode shape. The shaped electrode is covered on the outside or air side with an air-permeable hydrophobic membrane or film. This electrode, shaped as desired, forms the outside of the cell. It may form the outer container of the cell or if additional support is necessary, the supporting container provides suitable access of the air to the outside of the air-electrode composite.

As used herein the terms semiconductor copper oxide; defect copper oxide; black, defect copper oxide; lattice-defect copper oxide; semiconducting copper (II) oxide and Cu(II) oxide all refer to the same material. This active material is to be distinguished from the non-conducting stoichiometric copper oxides which are not sufficiently active as chemisorbing materials.

The silver component of the active silver lattice-defect copper oxide depolarizing mixture of our invention is preferably in powder form but any sufficiently comminuted form of silver will serve. Any suitable silver powder that provides a large surface area is satisfactory. Silver powders, reduced by electrolysis, hydrides, alkali metals or magnesium and alloy dissolution techniques have been used. In addition, under certain high drain requirements it may be desirable to introduce into the electrode foil, as a support or in addition to the support, silver wires or grids. Such additional silver serves primarily to decrease the internal resistance of the electrode and does not serve in the electrode reaction to any appreciable degree.

For the purposes of this invention, the hydrophobic polymer admixed with the silver-semiconductor copper mixture to form the dough to be shaped into electrode foils may be any of the characteristically hydrophobic polymers based on either carbon or the silicones to form halogen-containing polymers. The hydrophobic polymers alleviate, to some degree, the problem of electrode flooding by the electrolyte and provide the requisite three-phase interface between the solid electrode, the liquid electrolyte and the gaseous oxygen. Examples of such hydrophobic polymers are the fluocarbon polymers such as polytetrafluoroethelene (TFE), polytrifluoroethylene (TriFE), polyvinyl fluoride (PVF), polyvinylidene fluoride, polytetrafluoropropylene (PFP), polytrifluorochloroethylene, and the various copolymers of these and other fluocarbon monomers. The preferred fluocarbon is polytetrafluoroethylene, marketed by E. I. DuPont de Nemours & Co. as Teflon and is preferably applied to the silver-semiconductor copper mixture in the form of an emulsion marketed by that company as No. 30 or No. 42 DUPONT TFE Emulsion.

The silver $\phi$ defect copper oxide mixture when formulated with the hydrophobic polymer for the preparation of the paste and dough may contain any additives for improving the consistancy, spreadibility, moldability and/or the curing of the foils. The dough is used for fabricating such foils. Such additives are generally within the state of the art and their use is not excluded. Water and propylene glycol have been used for modifying the mass to proper spreading consistancy for the manufacture of the foils.

The hydrophobic films applied to the outside of the formed foils of the silver/defect Cu(II) Oxide must be permeable to gases and particularly to air and oxygen, but must be impermeable to the electrolyte within the cell. Preferred films include those prepared from "uncured" TFE resins and marketed by the Shambam Corporation of Fort Wayne, Indiana.

Specialized structures have been developed where the oxygen is introduced into the electrode interior by means other than diffusion through the outer wall. With such structures, under conditions where the three-phase equilibrium is maintained by such structures of other means, the hydrophobic film on the outside of the electrode foil is not required. For structural rigidity the air electrode may incorporate a grid or screen support of nickel or some other inert and conductive metal which will withstand the corrosive action of the electrolyte and serve as a current collector. This support may be porous and have the silver semiconductive-copper oxide TFE mixture embedded into its openings for promoting the reaction of the oxygen with the electrolyte. It may also be desirable to coat the grids or screens with Teflon in order to make them more inert to the electrolyte. Such coats are known to the art.

Oxygen electrodes prepared from mixtures of silver and copper (II) oxide defect, semiconductor CuO catalysts are set forth in the following examples and their relative output voltages versus a zinc reference electrode for different current densities compared with an oxygen electrode constructed from commercially available platinum catalyst electrodes. The examples are merely illustrative and not to be construed as limitative of the invention.

EXAMPLE 1

Eighty parts by weight of silver powder was blended with 20 parts by weight of black copper (II) oxide CuO powder in a ball mill for 2 hours. The powder mixture was blended with 20% by weight solids TFE from a No. 30 DuPont TFE emulsion diluted with an additional 30 parts by weight distilled water for uniform mixing. The resulting paste was dried in an air oven at 100°C for 4 hours. Propylene glycol was added to the paste with constant stirring until a globular rubbery dough was obtained. The Ag/CuO/TFE dough was then passed through rollers until a final foil thickness of 25 mils was obtained. The mixture loading at this thickness was 20 g/ft$^2$. The finished foil strip was then heated to 300°C for 5 minutes to "cure" the TFE resin and to evaporate the propylene glycol. The cured foil was then pressed onto a 70 mesh Teflon-coated nickel screen at a temperature of 270°C and pressure 800 psi to bond the foil layer which was about 20 mils thick to the screen. Then an air permeable Teflon hydrophobic film manufactured by Shambam Inc. was affixed to the "Air" side of the electrode at 270°C and 100 psi.

The finished electrode (80Ag/20CuO) was tested in a zinc-air cell as to obtain polarization characteristics. The cell was fabricated in the usual manner with a central zinc plate wrapped in porous separator and activated with 31% KOH. A zinc reference electrode was also inserted to obtain only air cathode polarization. The Table I below lists the results when compared in a similar cell with the electrode of commercially available platinum cathodes catalyzed with 9gPt/ft$^2$.

EXAMPLE 2

The procedure of Example 1 was repeated but using 70 parts by weight silver powder blended with 30 parts by weight CuO in place of the proportions shown in Example 1. Table I lists the results.

When the procedure of Example 1 was repeated with other weight ratios of silver powder and CuO in place of the respective proportions of Examples 1 and 2, the experiments indicated that catalyst weight ratios of from 90Ag:10CuO to 50Ag:50CuO produce acceptable output voltage stabilities versus current densities. As the silver proportion of the original ball mill mixture decreases from 90 to 50% of the total weight, the CuO proportion increases correspondingly from 10 to 50% of the total weight.

TABLE I

| Current Density ma/in$^2$ | ELECTRODE Example 1 | ELECTRODE Example 2 | PLATNIUM ELECTRODE 9g/ft$^2$ |
|---|---|---|---|
| | Voltage vs. Zn electrode | | |
| 25 | 1.37 | 1.36 | 1.38 |
| 50 | 1.36 | 1.35 | 1.37 |
| 100 | 1.34 | 1.33 | 1.35 |
| 200 | 1.31 | 1.29 | 1.32 |
| 400 | 1.28 | 1.25 | 1.29 |
| 800 | 1.21 | 1.17 | 1.19 |
| 1250 | 1.14 | 1.10 | 1.13 |
| 1875 | 1.06 | 0.98 | 1.04 |

From the above it can be seen that the electrodes of Examples 1 and 2 give equivalent performances to the platinum electrode up to about 400ma/in$^2$. At higher current density-x rates the electrode of Example 1 showed better performance than the platinum electrode. It should also be noted that the electrode of Example 2 was less than 10% below the platinum electrode in voltage. These electrodes were also tested against a Rhodium electrode with the same loading as the platinum and the results were substantially comparable. Basically the electrodes of this invention can satisfactorily perform whereever high rate capabilities are required. Furthermore, their cost is considerably lower than the cost of either platinum, rhodium or Ag/Hg electrodes capable of similar rates.

Weight ratios of 80Ag/CuO and 70Ag/30CuO gave the best performance, equivalent to that of the commercial oxygen electrode with the 9g/ft$^2$ platinum catalyst up to current densities of approximately 400 ma/in$^2$. At higher current densities the 80Ag/20CuO electrode showed moderately better performance than the platinum type at discharges initiated at room temperature.

Considering the relative lower material costs involved, electrodes of the present invention offer great advantages for use. While the electrode of this invention has been described in relation to the air-cells with zinc as the counter electrode, its use is not to be construed as limited to this particular embodiment. The electrodes of this invention also function as the oxygen electrodes in fuel cells with hydrogen and hydrazine or other suitable hydrocarbon fuels as the counter electrode.

In addition, the catalyst mixture of this invention shows excellent activity as a general purpose oxidation catalyst. Examples of oxo reactions where such catalysts are useful include oxidation of alkenes, alkynes and alkanols.

We claim:

1. A method for producing an oxygen electrode for contact with air or oxygen which comprises the steps of:
   a. combining silver and intrinsic semiconducting copper (II) oxide in selected proportions to form a homogeneous mixture;
   b. blending the mixture with an emulsion of a hydrophobic polymeric material to form a homogeneous paste;
   c. drying the paste;
   d. mixing said paste with a softener and blending the mix to obtain a pliable dough;
   e. rolling said dough into a thin foil form;
   f. curing the polymer in the dough by heat to form a foil; and
   g. bonding the cured foil into a porous support to form an oxygen electrode.

* * * * *